United States Patent
Zhou et al.

(10) Patent No.: US 11,218,634 B2
(45) Date of Patent: Jan. 4, 2022

(54) DATA PROCESSING METHOD AND APPARATUS, COMPUTER-READABLE STORAGE MEDIUM, AND ELECTRONIC DEVICE

(71) Applicant: GUANGDONG OPPO MOBILE TELECOMMUNICATIONS CORP., LTD., Guangdong (CN)

(72) Inventors: Haitao Zhou, Dongguan (CN); Ziqing Guo, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 312 days.

(21) Appl. No.: 16/488,760

(22) PCT Filed: Feb. 18, 2019

(86) PCT No.: PCT/CN2019/075357
§ 371 (c)(1),
(2) Date: Aug. 26, 2019

(87) PCT Pub. No.: WO2019/205777
PCT Pub. Date: Oct. 31, 2019

(65) Prior Publication Data
US 2021/0337120 A1     Oct. 28, 2021

(30) Foreign Application Priority Data
Apr. 28, 2018   (CN) .......................... 201810403359.1

(51) Int. Cl.
*H04N 5/232*    (2006.01)
*H04N 5/225*    (2006.01)

(52) U.S. Cl.
CPC ....... *H04N 5/23245* (2013.01); *H04N 5/2258* (2013.01); *H04N 5/23227* (2018.08); *H04N 5/23229* (2013.01)

(58) Field of Classification Search
CPC ... H04N 5/2258; H04N 5/23245; H04N 5/247
See application file for complete search history.

(56) References Cited

U.S. PATENT DOCUMENTS

| | | |
|---|---|---|
| 9,229,526 B1 | 1/2016 | Neglur |
| 2004/0119718 A1 | 6/2004 | Tadashi |

(Continued)

FOREIGN PATENT DOCUMENTS

| | | |
|---|---|---|
| CN | 1947344 A | 4/2007 |
| CN | 100420274 C | 9/2008 |

(Continued)

OTHER PUBLICATIONS

Second Office Action of the Chinese application No. 261910636051.6, dated Mar. 31, 2021.

(Continued)

*Primary Examiner* — Paul M Berardesca
(74) *Attorney, Agent, or Firm* — Ladas & Parry LLP (57) ABSTRACT

A data processing method and apparatus, a computer-readable storage medium and an electronic device (10) are provided. The method includes that: responsive to it is detected that an electronic device (10) activates a front camera (102), a second processor interface connecting a first image processor to a rear camera (104) is controlled to disconnect a connection between the first image processor and the rear camera, here, the first image processor is connected to the front camera (102) through a first processor interface; and the first image processor is controlled to be connected to a second image processor through the second (Continued)

processor interface, here, the second image processor is connected to the front camera (102).

20 Claims, 5 Drawing Sheets

(56) References Cited

U.S. PATENT DOCUMENTS

| | | | |
|---|---|---|---|
| 2005/0248685 | A1 | 11/2005 | Seo |
| 2011/0058053 | A1 | 3/2011 | Roh |
| 2012/0293680 | A1 | 11/2012 | Guan |
| 2013/0222636 | A1 | 8/2013 | Roh |
| 2014/0267631 | A1 | 9/2014 | Powers et al. |
| 2014/0267842 | A1 | 9/2014 | Lee et al. |
| 2015/0172539 | A1 | 6/2015 | Neglur |
| 2015/0205749 | A1* | 7/2015 | Whitby-Strevens ........................ G06F 13/426 348/207.11 |
| 2016/0127360 | A1* | 5/2016 | Ball .................. H04L 63/0861 726/7 |
| 2017/0085800 | A1 | 3/2017 | Wang et al. |
| 2019/0007605 | A1* | 1/2019 | Choe ................. H04N 5/23225 |
| 2021/0208831 | A1* | 7/2021 | Zhang .................. G06F 1/1694 |

FOREIGN PATENT DOCUMENTS

| | | |
|---|---|---|
| CN | 101299847 A | 11/2008 |
| CN | 101827219 A | 9/2010 |
| CN | 101582996 B | 12/2011 |
| CN | 103581551 A | 2/2014 |
| CN | 204069149 U | 12/2014 |
| CN | 104853944 A | 8/2015 |
| CN | 194987787 A | 10/2015 |
| CN | 100341571 A | 1/2017 |
| CN | 106657788 A | 5/2017 |
| CN | 106657796 A | 5/2017 |
| CN | 206533447 U | 9/2017 |
| CN | 108769508 A | 1/2018 |
| CN | 107864316 A | 3/2018 |
| CN | 107911597 A | 4/2018 |
| EP | 1422659 A1 | 5/2004 |
| EP | 2778898 A1 | 9/2014 |
| KR | 101283248 B1 | 7/2013 |

OTHER PUBLICATIONS

International Search Report in the international application No. PCT/CN2019/075357, dated Apr. 26, 2019.
Written Opinion of the International Search Authority in the international application No. PCT/CN2019/075357, dated Apr. 26, 2019.
Supplementary European Search Report in corresponding European application No. 197500481, dated Jan. 31, 2020.
First Office Action in corresponding Taiwanese application No. 108114618, dated Apr. 9, 2020.
International Search Report in corresponding international application No. PCT/CN2019/075357, dated Apr. 26, 2019.
First Office Aclian of the Chinese application No. 201910636051.6. dated Jul. 1, 2020.
First Office Action of the Chinese application No. 201810403369.1, dated Feb. 19, 2019.
First Office Action of the European application No. 19750048.1, dated Dec. 22, 2020.
Office Action of the Indian application No. 201917052529, dated Feb. 16, 2021.

* cited by examiner

FIG. 1

202
Responsive to it is detected that an electronic device activates a front camera, a second processor interface connecting a first image processor to a rear camera is controlled to disconnect a connection between the first image processor and the rear camera, here, the first image processor is connected to the front camera through a first processor interface

204
The first image processor is controlled to be connected to a second image processor through the second processor interface, here, the second image processor is connected to the front camera

DATA PROCESSING METHOD AND APPARATUS, COMPUTER-READABLE STORAGE MEDIUM, AND ELECTRONIC DEVICE

CROSS-REFERENCE TO RELATED APPLICATIONS

This application is an application under 35 U.S.C. 371 of International Application No. PCT/CN2019/075357, filed on Feb. 18, 2019, which claims priority and benefit of Chinese Patent Application No. 201810403359.1, filed on Apr. 28, 2018, the contents of each of which are hereby incorporated by reference in their entireties.

TECHNICAL FIELD

The disclosure relates to the field of computer technologies, and in particular to a method and device for processing data, a computer-readable storage medium, and an electronic device.

BACKGROUND

As functions integrated in a smart terminal are increasing, the hardware and software requirements for the smart terminal are higher. For example, the smart terminal may be used for making calls, playing games, shopping, taking photos, and the like. In order to realize the function of taking photos, a camera needs to be installed on the smart terminal. In order to realize the function of making calls, a microphone and an earpiece need to be installed on the smart terminal. In this way, the hardware resources of the smart terminal need to be highly integrated, so that the portability of the smart terminal can be realized.

SUMMARY

Embodiments of the disclosure provide a method and device for processing data, a computer-readable storage medium and an electronic device.

A method for processing data is provided. The method may include the following operations.

Responsive to it is detected that an electronic device activates a front camera, a second processor interface that connects a first image processor to a rear camera is controlled to disconnect a connection between the first image processor and the rear camera, here, the first image processor is connected to the front camera through a first processor interface.

The first image processor is controlled to be connected to a second image processor through the second processor interface, here, the second image processor is connected to the front camera.

A device for processing data is provided. The device may include an activation detection module and an interface switching module.

The activation detection module may be configured to control, responsive to it is detected that an electronic device activates a front camera, a second processor interface, that connects a first image processing to a rear camera, to disconnect a connection between the first image processing and the rear camera, here, the first image processor is connected to the front camera through a first processor interface.

The interface switching module may be configured to control the first image processor to be connected to a second image processor through the second processor interface, wherein the second image processor is connected to the front camera.

A computer-readable storage medium is provided. The computer-readable storage medium may have a computer program stored thereon. The computer program is executed by a processor to perform the following operations.

Responsive to it is detected that an electronic device activates a front camera, a second processor interface that connects a first image processor to a rear camera is controlled to disconnect a connection between the first image processor and the rear camera, here, the first image processor is connected to the front camera through a first processor interface.

The first image processor is controlled to be connected to a second image processor through the second processor interface, here, the second image processor is connected to the front camera.

An electronic device is provided. The electronic device may include a memory and a processor. The memory may store a computer-readable instruction that, when executed by the processor, cause the processor to perform the following operations.

Responsive to it is detected that an electronic device activates a front camera, a second processor interface that connects a first image processor to a rear camera is controlled to disconnect a connection between the first image processor and the rear camera, here, the first image processor is connected to the front camera through a first processor interface.

The first image processor is controlled to be connected to a second image processor through the second processor interface, here, the second image processor is connected to the front camera.

BRIEF DESCRIPTION OF DRAWINGS

In order to describe the technical solutions in the embodiments of the disclosure more clearly, the drawings required to be used in descriptions about the embodiments or the related art will be simply introduced below. Obviously, the drawings in the following descriptions are only some embodiments of the disclosure. Those of ordinary skilled in the art may further obtain other drawings according to these drawings without creative work.

DETAILED DESCRIPTION

In order to make the objectives, technical solutions and advantages of the disclosure clearer, the disclosure will be further elaborated below in conjunction with the drawings and the embodiments. It will be appreciated that specific embodiments described here are only used to explain the disclosure, not to limit the disclosure.

It will be understood that the terms "first", "second" and the like, as used herein, may be used to describe various elements, but these elements are not limited by these terms. These terms are only used to distinguish one element from another. For example, a first client may be referred to as a second client without departing from the scope of the disclosure, and similarly, a second client may be referred to as a first client. Both the first client and the second client are clients, but they are not the same client.

Figure 2:
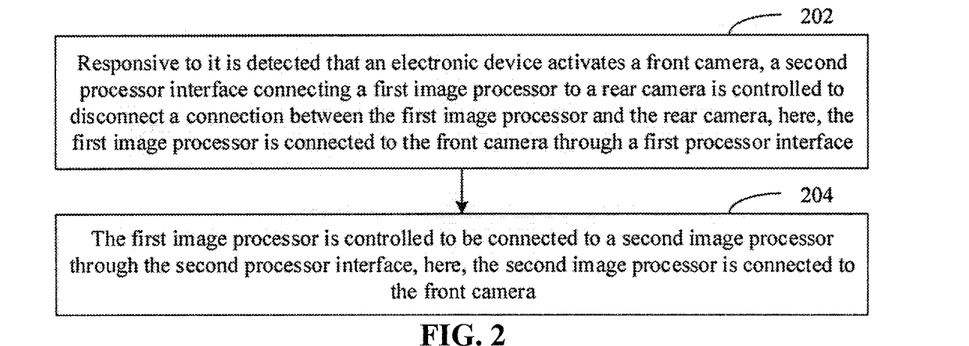
FIG. 2 is a flowchart of a method for processing data according to an embodiment of the disclosure.

Referring to FIG. 2, a method for processing data of the disclosure includes operations 202 and 204.

At block 202, responsive to it is detected that an electronic device activates a front camera, a second processor interface connecting a first image processor to a rear camera is controlled to disconnect a connection between the first image processor and the rear camera, here, the first image processor is connected to the front camera through a first processor interface.

At block 204, the first image processor is controlled to be connected to a second image processor through the second processor interface, here, the second image processor is connected to the front camera.

In an embodiment, the front camera includes a laser camera and a visible light camera.

Figure 4:
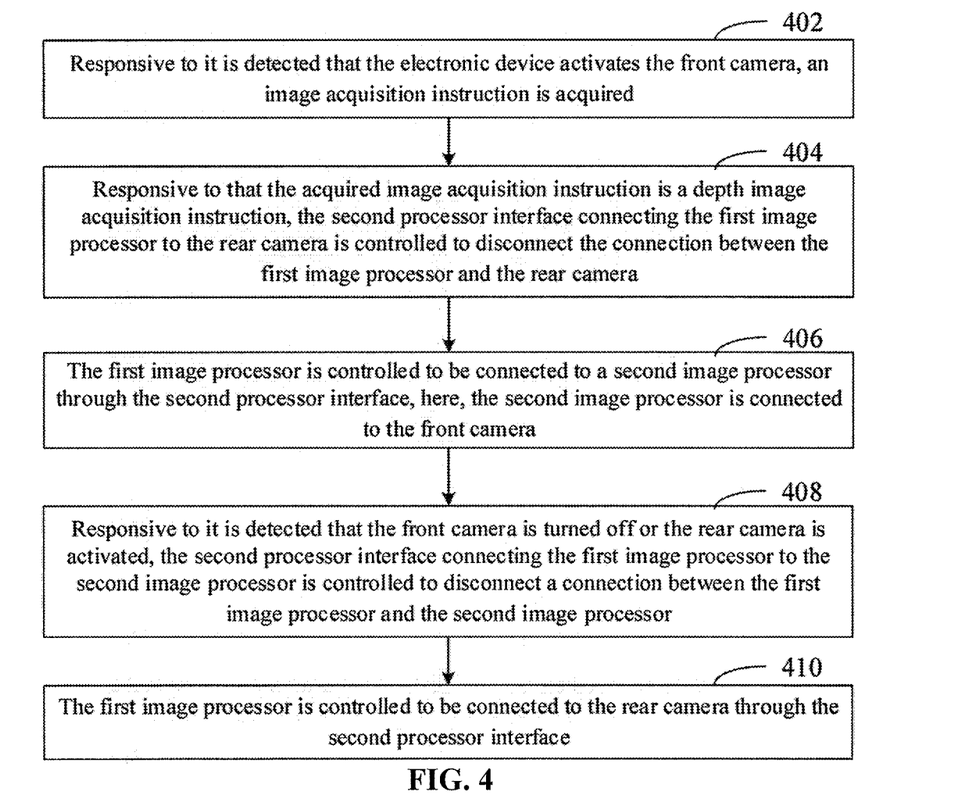
FIG. 4 is a flowchart of a method for processing data according to another embodiment of the disclosure.

Referring to FIG. 4, in an embodiment, the method for processing data further includes operations 402 and 404.

At block 402, responsive to it is detected that the electronic device activates the front camera, an image acquisition instruction is acquired.

At block 404, responsive to that the acquired image acquisition instruction is a depth image acquisition instruction, the second processor interface connecting the first image processor to the rear camera is controlled to disconnect the connection between the first image processor and the rear camera.

Figure 5:
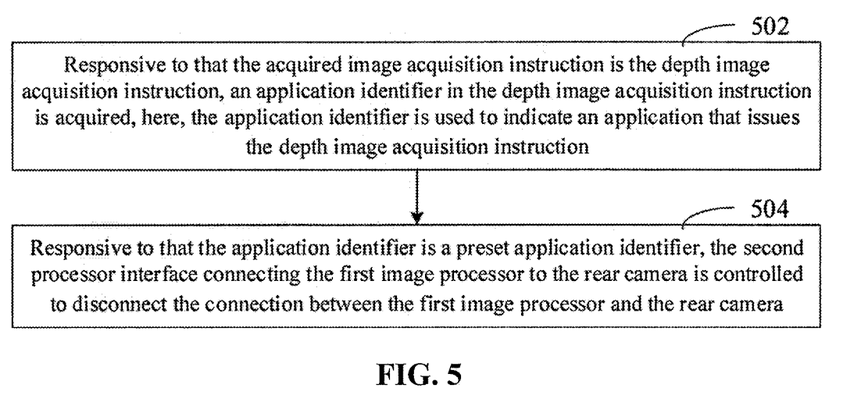
FIG. 5 is a flowchart of a method for processing data according to yet another embodiment of the disclosure.

Referring to FIG. 5, in an embodiment, the method for processing data further includes operations 502 and 504.

At block 502, responsive to that the acquired image acquisition instruction is the depth image acquisition instruction, an application identifier in the depth image acquisition instruction is acquired, here, the application identifier is used to indicate an application that issues the depth image acquisition instruction.

At block 504, responsive to that the application identifier is a preset application identifier, the second processor interface connecting the first image processor to the rear camera is controlled to disconnect the connection between the first image processor and the rear camera.

Figure 6:
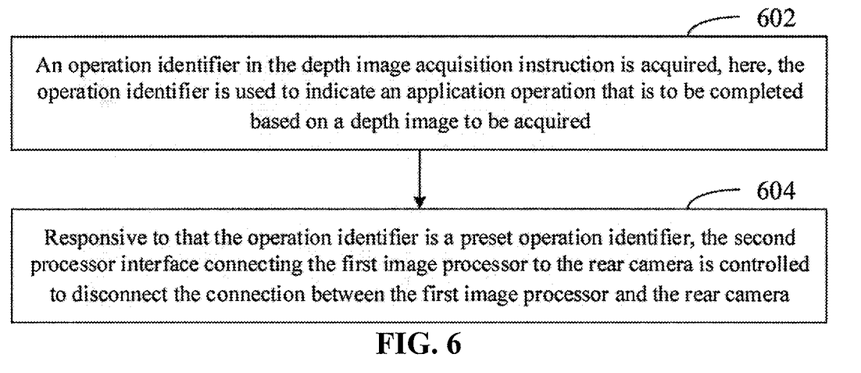
FIG. 6 is a flowchart of a method for processing data according to still another embodiment of the disclosure.

Referring to FIG. 6, in an embodiment, the method for processing data further includes operations 602 and 604.

At block 602, an operation identifier in the depth image acquisition instruction is acquired, here, the operation identifier is used to indicate an application operation that is to be completed based on a depth image to be acquired.

At block 604, responsive to that the operation identifier is a preset operation identifier, the second processor interface connecting the first image processor to the rear camera is controlled to disconnect the connection between the first image processor and the rear camera.

In an embodiment, the image acquisition instruction includes a type identifier, here, the type identifier is used to indicate a type of an image to be acquired that is indicated by the image acquisition instructions.

Referring to FIG. 4, in an embodiment, the method for processing data further includes operations 408 and 410.

At block 408, responsive to it is detected that the front camera is turned off or the rear camera is activated, the second processor interface connecting the first image processor to the second image processor is controlled to disconnect a connection between the first image processor and the second image processor.

At block 410, the first image processor is controlled to be connected to the rear camera through the second processor interface.

Figure 7:
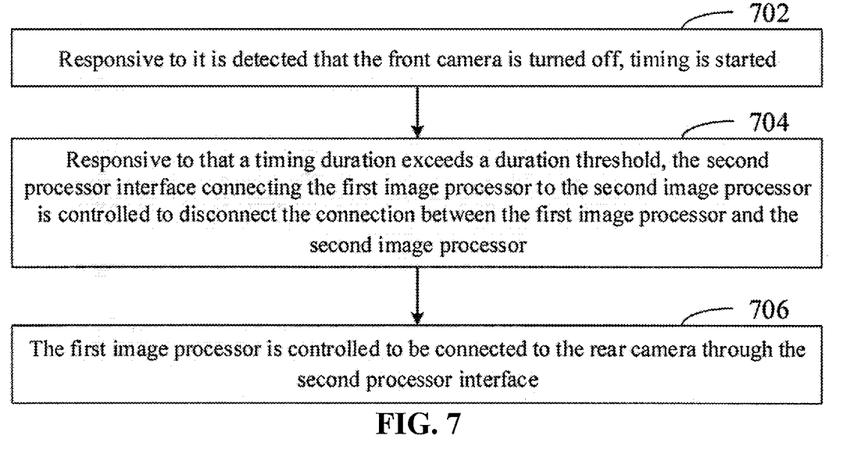
FIG. 7 is a flowchart of a method for processing data according to yet still another embodiment of the disclosure.

Referring to FIG. 7, in an embodiment, the method for processing data further includes operations 702 and 704.

At block 702, responsive to it is detected that the front camera is turned off, timing is started.

At block 704, responsive to that a timing duration exceeds a duration threshold, the second processor interface connecting the first image processor to the second image processor is controlled to disconnect a connection between the first image processor and the second image processor.

At block 706, the first image processor is controlled to be connected to the rear camera through the second processor interface.

In an embodiment, the method for processing data further includes that a frequency at which the front camera is activated is counted, and the duration threshold is acquired according to the frequency.

Figure 10:
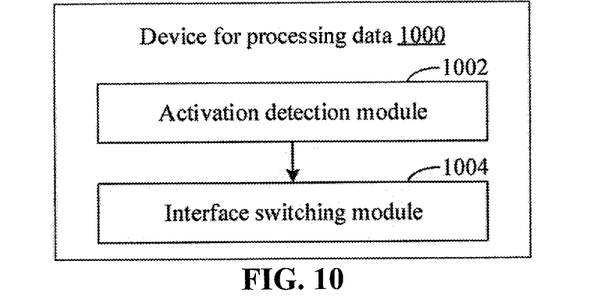
FIG. 10 is a structure diagram of a device for processing data according to an embodiment of the disclosure.

Referring to FIG. 10, a device 1000 for processing data of the disclosure includes an activation detection module 1002 and an interface switching module 1004.

The activation detection module 1002 is configured to control, responsive to it is detected that an electronic device activates a front camera, a second processor interface, that connects a first image processor to a rear camera, to disconnect a connection between the first image processor and the rear camera, here, the first image processor is connected to the front camera through a first processor interface.

The interface switching module 1004 is configured to control the first image processor to be connected to a second image processor through the second processor interface, here, the second image processor is connected to the front camera.

In an embodiment, the front camera includes a laser camera and a visible light camera.

Figure 11:
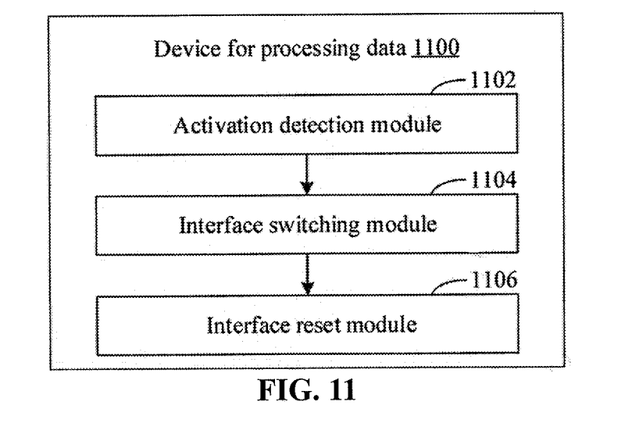
FIG. 11 is a structure diagram of a device for processing data according to another embodiment of the disclosure.

Referring to FIG. 10 and FIG. 11, in an embodiment, the interface switching module 1004 (1104) is further configured to: responsive to it is detected that the electronic device activates the front camera, acquire an image acquisition instruction; and responsive to that the acquired image acquisition instruction is a depth image acquisition instruction, control the second processor interface, that connects the first image processor to the rear camera, to disconnect the connection between the first image processor and the rear camera.

In an embodiment, the interface switching module 1004 (1104) is further configured to acquire, responsive to that the acquired image acquisition instruction is the depth image acquisition instruction, an application identifier in the depth image acquisition instruction, here, the application identifier is used to indicate an application that issues the depth image acquisition instruction.

The interface switching module 1004 (1104) is further configured to control, responsive to that the application identifier is a preset application identifier, the second processor interface that connects the first image processor to the rear camera, to disconnect the connection between the first image processor and the rear camera.

In an embodiment, the interface switching module 1004 (1104) is further configured to acquire an operation identifier in the depth image acquisition instruction, here, the operation identifier is used to indicate an application operation that is to be completed based on a depth image to be acquired.

The interface switching module 1004 (1104) is further configured to control, responsive to that the operation identifier is a preset operation identifier, the second processor interface, that connects the first image processor to the rear camera, to disconnect the connection between the first image processor and the rear camera.

In an embodiment, the image acquisition instruction includes a type identifier, here, the type identifier is used to indicate a type of an image to be acquired that is indicated by the image acquisition instruction.

In an embodiment, the device further includes an interface reset module 1106. The interface reset module 1106 is configured to: responsive to it is detected that the front camera is turned off or the rear camera is activated, control the second processor interface, that connects the first image processor to the second image processor, to disconnect a connection between the first image processor and the second image processor; and control the first image processor to be connected to the rear camera through the second processor interface.

In an embodiment, the device further includes an interface reset module 1106. The interface reset module 1106 is configured to: responsive to it is detected that the front camera is turned off, start timing; responsive to that a timing duration exceeds a duration threshold, control the second processor interface, that connects the first image processor to the second image processor, to disconnect the connection between the first image processor and the second image processor; and control the first image processor to be connected to the rear camera through the second processor interface.

In an embodiment, the interface reset module 1106 is further configured to count a frequency at which the front camera is activated, and acquire the duration threshold according to the frequency.

A computer-readable storage medium of the disclosure has a computer program stored thereon, the computer program is executed by a processor to implement the method for processing data in any one of the above embodiments.

The electronic device 10 of the disclosure includes a memory and a processor. The memory stores a computer-readable instruction that, when executed by the processor, causes the processor to perform the method for processing data in any one of the above embodiments.

According to the method and device for processing data, the computer-readable storage medium and the electronic device in the above embodiments, the electronic device may, responsive to it is detected that a front camera is activated, control a second processor interface connecting a first image processor to a rear camera to disconnect a connection between the first image processor and the rear camera; and may control the first image processor to be connected to a second image processor through the second processor interface. When the electronic device takes a picture through a camera, generally only one of the front camera and the rear camera is activated at the same time, so responsive to it is detected that the front camera is activated, the second processor interface for connecting the first image processor to the rear camera may be used to connect the first image processor to the second image processor. Thus, the time division multiplexing of the second processor interface by the rear camera and the second image processor can be realized, and resources of the electronic device are saved.

Figure 1:
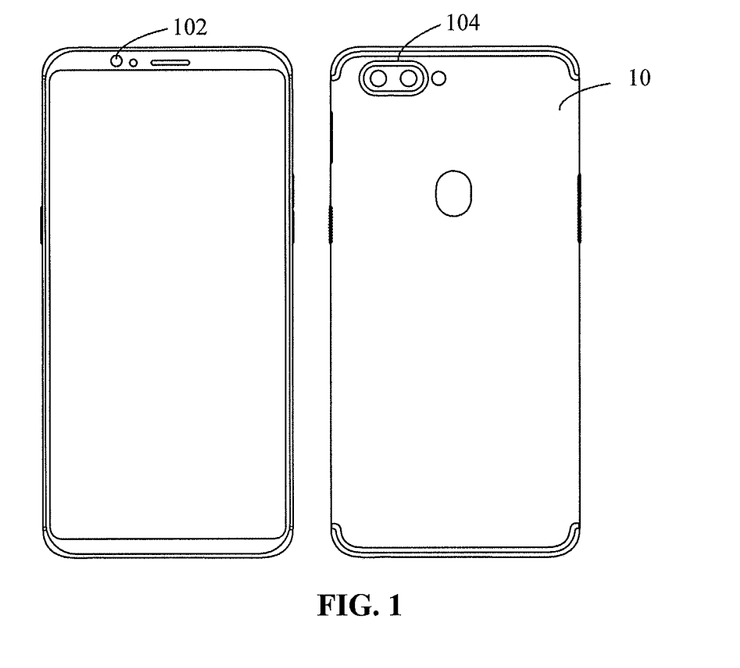
FIG. 1 is an application environment diagram of a method for processing data according to an embodiment of the disclosure.

FIG. 1 is an application environment diagram of a method for processing data in an embodiment. As illustrated in FIG. 1, the application environment of the method for processing data includes an electronic device 10. A front camera 102 and a rear camera 104 are installed on the electronic device 10, and the electronic device 10 further includes a first image processor and a second image processor. The first image processor is connected to the front camera 102 through a first processor interface, the first image processor is connected to the rear camera 104 through a second processor interface, and the second image processor is connected to the front camera 102. Responsive to it is detected that the electronic device 10 activates the front camera 102, the second processor interface connecting the first image processor to the rear camera 104 is controlled to disconnect a connection between the first image processor and the rear camera 104 through the second processor interface, and then the first image processor is controlled to be connected to the second image processor through the second processor interface. The electronic device 10 may be any device in which a front camera and a rear camera are installed, which is not limited in the embodiment. For example, the electronic device may be a personal computer, a mobile terminal, a personal digital assistant, a wearable electronic device, or the like.

FIG. 2 is a flowchart of a method for processing data in an embodiment. As illustrated in FIG. 2, the method for processing data includes operations 202 to 204.

At block 202, responsive to it is detected that an electronic device activates a front camera, a second processor interface connecting a first image processor to a rear camera is controlled to disconnect a connection between the first image processor and the rear camera through the second processor interface, here, the first image processor is connected to the front camera through a first processor interface.

In an embodiment, a camera may be installed on the electronic device, and images may be acquired by the installed camera. The camera may be divided into a laser camera, a visible light camera and the like according to different acquired images. The laser camera may acquire an image formed by laser irradiation onto an object, and the visible light camera may acquire an image formed by visible light irradiation onto an object. Several cameras may be installed on the electronic device, and the installation location is not limited. For example, a camera may be installed on a front panel of the electronic device, and two cameras may be installed on a back panel of the electronic device. The camera may also be installed inside the electronic device in a built-in manner, and then the camera may be turned on by rotating or sliding.

An image processor is a processor capable of processing an image acquired by the camera. The image processor is connected to the camera, and the image acquired by the camera may be transmitted to the image processor, and processed by the image processor for cropping, brightness adjustment, face detection, and the like. The front camera and the rear camera may capture images from different perspectives. Generally, the front camera may capture images from the front view of the electronic device, and the rear camera may capture images from the back view of the electronic device. Both the front camera and the rear camera are connected to the image processor, and the acquired image is processed by the image processor.

In the embodiment provided by the disclosure, the electronic device includes a first image processor and a second image processor, and both the first image processor and the second image processor may process the image. Specifically, both the front camera and the rear camera are connected to the first image processor, and the front camera is connected to the second image processor. The first image processor may process the images acquired by the front camera and the rear camera, and the second image processor generally processes only the image acquired by the front camera. A processor interface may be an interface for connecting the image processor with other components. The first image processor includes a first processor interface and a second processor interface, and is connected to the front camera through the first processor interface and to the rear camera through the second processor interface.

Figure 3:
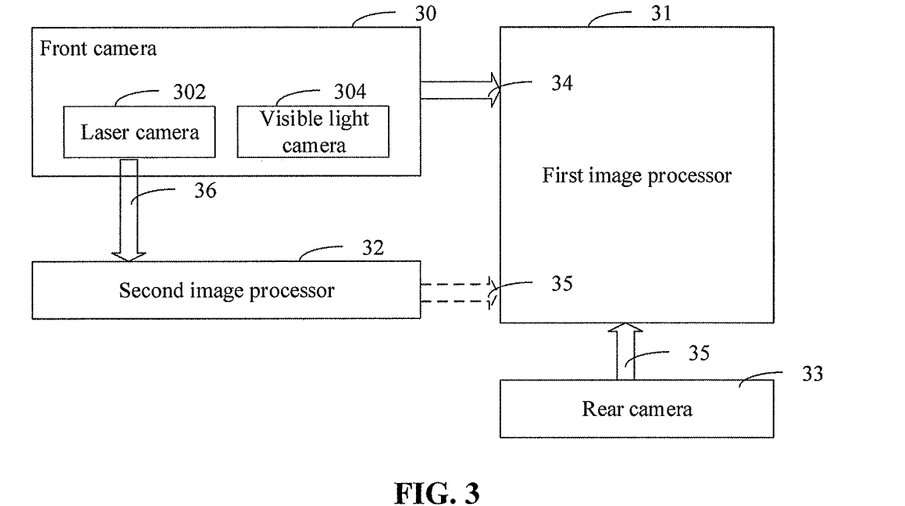
FIG. 3 is an internal structure diagram of an electronic device according to an embodiment of the disclosure.

FIG. 3 is an internal structure diagram of an electronic device in an embodiment. As illustrated in FIG. 3, the electronic device includes a front camera 30, a first image processor 31, a second image processor 32, and a rear camera 33. The front camera 30 includes a laser camera 302 and a visible light camera 304. The front camera 30 is connected with the first image processor 31 through a first processor interface 34, the first image processor 31 is connected with the rear camera 33 through a second processor interface 35, and the front camera 30 is connected with the second image processor 32 through a third processor interface 36. When the electronic device detects that the front camera 30 is activated, the second processor interface 35 connecting the first image processor 31 with the rear camera 33 is controlled to disconnect a connection between the first image processor 31 and the rear camera 33, and then the first image processor 31 is controlled to be connected to the second image processor 32 through the second processor interface 35. It can be understood that the laser camera 302 may generally acquire a speckle image formed by laser speckle irradiated on an object, and calculate a depth image according to the speckle image. The acquired depth image can be used for verification such as payment and unlocking. The first image processor 31 may be a Central Processing Unit (CPU) of the electronic device, and the second image processor 32 may be an external Micro Controller Unit (MCU). The external MCU is an external processor that is isolated from a system of the electronic device, so the external MCU can ensure the security of processed data. When an image is acquired by the front camera 30 for payment, unlocking, etc., in order to ensure data security, the acquired speckle image can be processed by the external MCU (second image processor 32) to calculate and obtain a depth image, and the obtained depth image is sent to a Trusted Execution Environment (TEE) in the CPU (first image processor 31) for subsequent processing.

Referring to FIG. 2, at block 204, the first image processor is controlled to be connected to a second image processor through the second processor interface, here, the second image processor is connected to the front camera.

Since the front camera and the rear camera acquire images from different viewing angles, when the electronic device captures an image, the front camera and the rear camera are generally not activated simultaneously for shooting. In order to save interface resources of the image processors, the second processor interface connecting the first image processor to the rear camera may be controlled to disconnect the connection between the first image processor and the rear camera when the electronic device activates the front camera, and the first image processor is connected with the second image processor through the second processor interface. After the connection, the front camera may be connected to the first image processor and to the second image processor, and the first image processor is also connected with the second image processor. Thus, the image generated by the front camera may be directly sent to the first image processor for processing; or may be sent to the second image processor first and then sent to the first image processor by the second image processor, that is, the image may be processed together by the first image processor and the second image processor.

At present, multiple applications in a smart terminal are running at the same time, the memory and processor consumptions of the smart terminal are also very large. Therefore, how to reduce the consumption of terminal resources is particularly important.

According to the method for processing data provided by the above embodiment, the electronic device may, responsive to it is detected that the front camera is activated, control a second processor interface connecting a first image processor to a rear camera to disconnect a connection between the first image processor and the rear camera; and may control the first image processor to be connected to a second image processor through the second processor interface. When the electronic device takes a picture through a camera, generally only one of the front camera and the rear camera is turned on at the same time, so responsive to it is detected that the front camera is turned on, the second processor interface for connecting the first image processor to the rear camera may be used to connect the first image processor to the second image processor. Thus, the time division multiplexing of the second processor interface by the rear camera and the second image processor can be realized, and resources of the electronic device are saved.

FIG. 4 is a flowchart of a method for processing data in another embodiment. As illustrated in FIG. 4, the method for processing data includes operations 402 to 410.

At block 402, responsive to it is detected that an electronic device activates a front camera, an image acquisition instruction is acquired.

In an embodiment, the electronic device may monitor the state of the front camera in real time, and responsive to it is detected that the front camera is activated, it can be detected whether the image acquisition instruction is received in real time. The monitoring of the state of the front camera can be implemented by software or by hardware. Specifically, when the front camera is activated, the system of the electronic device may send the state of the front camera to each application (APP) by means of broadcasting, and the application registered with a broadcast receiver may monitor the state of the front camera. In addition, when the front camera is activated, an electrical signal of the front camera may be detected. If an electrical signal such as voltage, current, and Input/Output (I/O) is detected from the front camera, it is determined that the front camera is activated.

An application may be installed in the electronic device, and the application may call the camera for acquiring an image. The image acquisition instruction may be an instruction for acquiring an image through a camera, which may be entered by a user or automatically generated by the electronic device. For example, when taking a photo, the user can directly call the camera to take a photo. The user can also perform unlock verification through the face. When the user lights up the screen, the electronic device automatically generates an image acquisition instruction, and acquires an image according to the image acquisition instruction to perform unlock verification.

After the front camera is activated, it is possible that the front camera is not used for taking images. For example, when taking a photo, the shooting process is generally divided into a preview phase and a shooting phase. During the preview phase, the camera acquires a current screen as a preview image in real time and displays the preview image on a display screen of the electronic device. The preview image acquired during the preview process will not be stored, and the user can adjust a position and angle of shooting in real time through the preview image displayed on the display screen. The image acquisition instruction is entered only after the user adjusts the position and angle of shooting. The electronic device will take an image according to the image acquisition instruction after detecting the image acquisition instruction. Therefore, responsive to it is detected that the front camera is activated, the electronic device may not immediately connect the second processor interface to the second image processor. After obtaining the image acquisition instruction, the second processor interface is connected to the second image processor, which can avoid frequent switching of processor interfaces and save resources.

At block 404, responsive to that the acquired image acquisition instruction is a depth image acquisition instruction, a second processor interface connecting a first image processor to a rear camera is controlled to disconnect a connection between the first image processor and the rear camera through the second processor interface.

Specifically, the front camera includes a laser camera and a visible light camera, and the laser camera may acquire a speckle image formed by laser speckle irradiated on an object, and calculate a depth image according to the speckle image. The visible light camera may acquire Red Green Blue (RGB) images, and both the RGB image and the depth image are composed of several pixels. Generally, the acquired RGB image corresponds to the acquired depth image, a pixel value in the RGB image is used to represent the color of a pixel point, and a pixel value in the depth image is used to represent the depth of the pixel point.

When the front camera is activated, if an image acquisition instruction is acquired, it can be determined whether the image acquisition instruction is used to acquire an RGB image or to acquire a depth image. If the RGB image is acquired, the RGB image acquired by the front camera can be directly sent to the first image processor through the first processor interface, and the image is processed by the first image processor. If the depth image is acquired, it can be determined that the acquired depth image needs to be used for high-security processing such as payment and unlocking, the speckle image acquired by the front camera can be directly sent to the second image processor to calculate the depth image, and the depth image is sent by the second image processor through the second processor interface to the first image processor for processing.

In an embodiment, the image acquisition instruction may include a type identifier for identifying a type of an image to be acquired, and it may be determined according to the type identifier whether the image acquisition instruction is used for acquiring an RGB image or a depth image. For example, the type identifier may be "RGBget" or "Depthget", "RGBget" indicates that the image acquisition instruction is used to acquire an RGB image, and "Depthget" indicates that the image acquisition instruction is used to acquire a depth image. When the acquired image acquisition instruction is a depth image acquisition instruction, the second processor interface connecting the first image processor to the rear camera is controlled to disconnect the connection between the first image processor and the rear camera, and the first image processor is controlled to be connected to the second image processor through the second processor interface.

At block 406, the first image processor is controlled to be connected to a second image processor through the second processor interface, here, the second image processor is connected to the front camera.

In an embodiment, the first processor interface and the second processor interface may implement data transmission between the image processor and the camera, as well as data transmission between the image processors. For example, the first processor interface and the second processor interface may be Mobile Industry Processor Interface (MIPI) interfaces. Specifically, the switching of the processor interface may be implemented by means of software or by hardware. When implemented by software, an interface switching instruction may be issued to the first image processor to connect the second processor interface to the second image processor. When implemented by hardware, the second processor interface may be switched to the second image processor directly through a switch circuit.

At block 408, responsive to it is detected that the front camera is turned off or the rear camera is activated, the second processor interface connecting the first image processor to the second image processor is controlled to disconnect a connection between the first image processor and the second image processor through the second processor interface.

After the first image processor is disconnected from the rear camera and connected to the second image processor, in order to ensure the normal operation of the rear camera, the connection of the rear camera to the first image processor needs to be re-established. Specifically, the state of the front camera may be detected, and the state of the rear camera may also be detected. Responsive to it is detected that the front camera is turned off or the rear camera is activated, the connection between the first image processor and the rear camera is re-established to ensure the normal operation of the rear camera.

At block 410, the first image processor is controlled to be connected to the rear camera through the second processor interface.

In an embodiment, responsive to it is detected that the acquired image acquisition instruction is a depth image acquisition instruction, an application identifier in the depth image acquisition instruction may be acquired, an application that issues the depth image acquisition instruction is determined according to the application identifier, and it is determined according to the application whether the second processor interface needs to be connected to the second image processor. Referring to FIG. 5, the method specifically includes the operations as follows.

At block 502, responsive to that the acquired image acquisition instruction is the depth image acquisition instruction, an application identifier in the depth image acquisition instruction is acquired, here, the application identifier is used to indicate an application that issues the depth image acquisition instruction.

Specifically, an application may be installed in the electronic device, the application may be software written in the electronic device for a certain application purpose, and the electronic device may implement the service demanded by a user through the application. For example, a user may play a game through a game application, may perform a transaction payment through a payment application, or may play music through a music application. The application identifier may indicate an application that issues a depth image acquisition instruction, and according to the application identifier, it may be identified which application issues the image acquisition instruction.

At block 504, responsive to that the application identifier is a preset application identifier, the second processor interface connecting the first image processor to the rear camera is controlled to disconnect the connection between the first image processor and the rear camera through the second processor interface.

It can be understood that the application operations that are completed by the user through the electronic device are implemented by the applications, and the applications in the electronic device may be divided into security applications and non-security applications. The security applications require high data security, and the non-security applications require relatively low data security. For example, payment-based applications have high data security requirement, and game-based applications have relatively lower data security requirement. Thus, it can be determined, based on an application that issues the depth image acquisition instruction, whether a depth image is to be acquired through a secure channel.

Specifically, when the application identifier is a preset application identifier, the acquired depth image may be used to perform an application operation with high security requirement, and the depth image may be acquired through a secure channel. The second processor interface connecting the first image processor to the rear camera is controlled to disconnect the connection between the first image processor and the rear camera, and the first image processor is to be connected to the second image processor through the second processor interface. Thus, the speckle image acquired by the front camera may be sent to the second image processor, a depth image is calculated in the second image processor, and the second image processor sends the calculated depth image to the first image processor. Since the second image processor is an external MCU, secure processing of the image can be achieved.

Further, the depth image is acquired for the security application, which may be used for an application operation with a high secure requirement or for an application operation with a low security requirement. For example, a payment application may perform payment verification by acquiring a depth image, or may implement an Augmented Reality (AR) technology by acquiring a depth image. The specific application operation may be used to determine whether the processor interface needs to be switched. After it is determined that the application identifier in the depth image acquisition instruction is the preset application identifier, referring to FIG. 6, the method may further include the operations as follows.

At block 602, an operation identifier in the depth image acquisition instruction is acquired, here, the operation identifier is used to indicate an application operation that is to be completed based on a depth image to be acquired.

In an embodiment, the operation identifier is used to indicate an application operation that is to be completed based on the depth image to be acquired, and the electronic device may preset an operation identifier corresponding to each application operation, the application operation may be identified by the operation identifier. For example, the beauty processing of a portrait in the RGB image is completed based on the acquired depth image, and thus the operation identifier is an operation identifier corresponding to the beauty processing. If a two-dimensional (2D) image needs to be converted into a 3D image based on the acquired depth image, the operation identifier is an operation identifier corresponding to 3D conversion.

At block 604, responsive to that the operation identifier is a preset operation identifier, the second processor interface connecting the first image processor to the rear camera is controlled to disconnect the connection between the first image processor and the rear camera through the second processor interface.

If the operation identifier is a preset operation identifier, it is determined that the acquired depth image is used for an application operation with high security requirement, the first image processor may be disconnected from the rear camera, and the first image processor is connected to the second image processor through the second processor interface.

After the rear camera is disconnected from the first image processor, if it is detected that the front camera is turned off, the rear camera and the first image processor can be reconnected immediately, or can be reconnected after a period of time. Referring to FIG. 7, the process of re-establishing the connection may specifically include the operations as follows.

At block 702, responsive to it is detected that the front camera is turned off, timing is started.

A timer may be set in the electronic device, and responsive to it is detected that the front camera is turned off, the timer starts timing. The Android system is taken as an example. The system may pre-define a timer. Responsive to it is detected that the front camera is turned off, the timer is cleared by timer.setBase(SystemClock.elapsedRealtime( )) and then started by a timer.start( ) function to start timing.

At block 704, responsive to that a timing duration exceeds a duration threshold, the second processor interface connecting the first image processor to the second image processor is controlled to disconnect the connection between the first image processor and the second image processor through the second processor interface.

The first image processor is re-controlled to be connected to the rear camera through the second processor interface when the timing duration exceeds the duration threshold. The user may set the duration threshold, and the system may also set the duration threshold in advance. For example, the duration threshold may be 5 seconds, and responsive to it is detected that the front camera is turned off for more than 5 seconds, the first image processor may be controlled to be reconnected to the rear camera. Thus, power consumption of the electronic device that is caused by frequent switching of the processor interfaces during the process of re-turning on the front camera by the user when the front camera is accidentally turned off can be prevented.

In an embodiment, the electronic device may count a frequency at which the front camera is activated and adjust the duration threshold according to the frequency. Generally, if the frequency is higher, it is determined that the possibility that the front camera is activated again after the front camera is turned off is large, thus after the front camera is turned off, the second processor interface can be connected to the rear camera after a long time interval. Specifically, a frequency at which the front camera is activated is counted, and the duration threshold is acquired according to the frequency.

The electronic device may record operating data of the front camera, the recorded data may include an activation time, a turn-off time, an activation duration, and the like. The electronic device may acquire recorded historical operating data of the front camera, and the frequency at which the front camera is activated is counted according to the historical operating data. The counted frequency may be the number of activations in a period of time. For example, the average number of activations of the front camera within one day may be counted as the frequency at which the front camera is activated. Then, correspondences between frequencies and duration thresholds are established, and the duration threshold is acquired according to the counted frequency.

At block 706, the first image processor is controlled to be connected to the rear camera through the second processor interface.

According to the method for processing data provided by the above embodiment, the electronic device may, responsive to it is detected that a front camera is activated, control the second processor interface connecting the first image processor to the rear camera to disconnect the connection between the first image processor and the rear camera, according to an image acquisition instruction; and may control the first image processor to be connected to a second image processor through the second processor interface. When the electronic device takes a picture through a camera, generally only one of the front camera and the rear camera is turned on at the same time, so responsive to it is detected that the front camera is activated, the second processor interface for connecting to the rear camera may be used to connect to the second image processor. Thus, the time division multiplexing of the second processor interface by the rear camera and the second image processor can be realized, and resources of the electronic device are saved. Moreover, only when the depth image is acquired, image processing is performed by the second image processor, and the processor interface is switched, so that it is possible to more accurately determine whether the processor interface needs to be switched to avoid waste of resources.

It is to be understood that although various operations in the flowchart in FIGS. 2, 4, 5, 6, and 7 are displayed in sequence according to the indication of an arrow, these operations are not necessarily performed in the sequence indicated by the arrow. Unless expressly stated herein, there is no strict sequence limitation to these operations, which may be performed in other sequences. Moreover, at least some operations in FIGS. 2, 4, 5, 6, and 7 may include multiple sub-operations or multiple stages, these sub-operations or stages are not necessarily completed at the same moment but may be performed at different moments, and these sub-operations or stages are not necessarily performed in a sequence but may be performed in turns or alternately with at least some of other operations or sub-operations or stages of the other operations.

Figure 8:
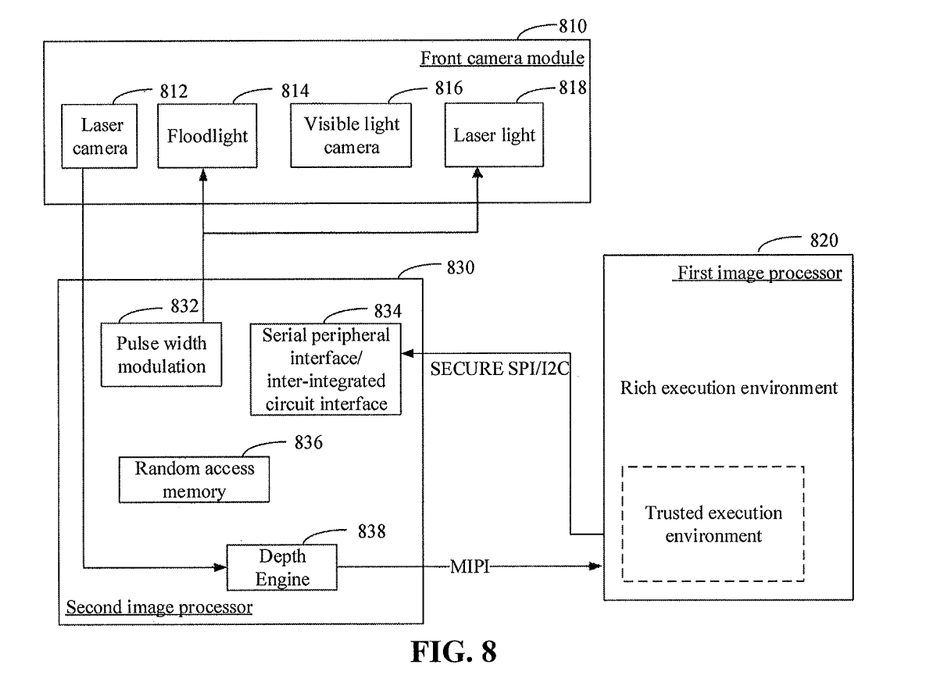
FIG. 8 is an internal structure diagram of an electronic device according to another embodiment of the disclosure.

FIG. 8 is an internal structure diagram of an electronic device in another embodiment. As illustrated in FIG. 8, the electronic device may include a front camera module 810, a first image processor 820, and a second image processor 830. The front camera module 810 includes a laser camera 812, a floodlight 814, a visible light camera 816, and a laser light 818. The first image processor 820 includes a first image processor core operating in a TEE and a first image processor core operating in a Rich Execution Environment (REE). Both the TEE and the REE are operating modes of advanced RISC machines. Generally, an operation behavior with a higher security level in the electronic device needs to be performed in the TEE, and other operation behaviors may be performed in the REE. The second image processor 830 is an external MCU, including a Pulse Width Modulation (PWM) module 832, a Serial Peripheral Interface/Inter-Integrated Circuit (SPI/I2C) interface 834, a Random Access Memory (RAM) module 836, and a depth engine module 838. In the embodiment of the disclosure, when the first image processor 820 receives the depth image acquisition instruction of the application, for example, when the application requires face information for unlocking and the application requires face information for payment, the first image processor core operating in the TEE may send a depth image acquisition instruction to the SPI/I2C module 834 in the MCU 830 through the SECURE SPI/I2C, and the second image processor 830 may transmit a pulse wave through the PWM module 832 to control the floodlight 814 in the front camera module 810 to be activated to acquire an infrared image, and to control the laser light 818 in the front camera module 810 to be activated to acquire a speckle image. The front camera module 810 may transmit the acquired speckle image to the depth engine module 838 in the second image processor 830, and the second image processor 830 may calculate a depth image according to the speckle image, and then send the infrared image and the depth image to the first image processor 820. The first image processor 820 performs face recognition according to the acquired infrared image to detect whether there is a face in the infrared image and whether the detected face matches a stored face; if the face recognition succeeds, living body detection is performed according to the infrared image and the depth image to determine whether the face is a living face. In an embodiment, after acquiring the infrared image and the depth image, the first image processor 820 may perform the living body detection and then perform the face recognition, or perform the face recognition and the living body detection simultaneously. The first image processor 820 may send the results of face recognition and living body detection to the application, and the application performs processing such as unlocking and payment according to the results of face recognition and living body detection.

Figure 9:
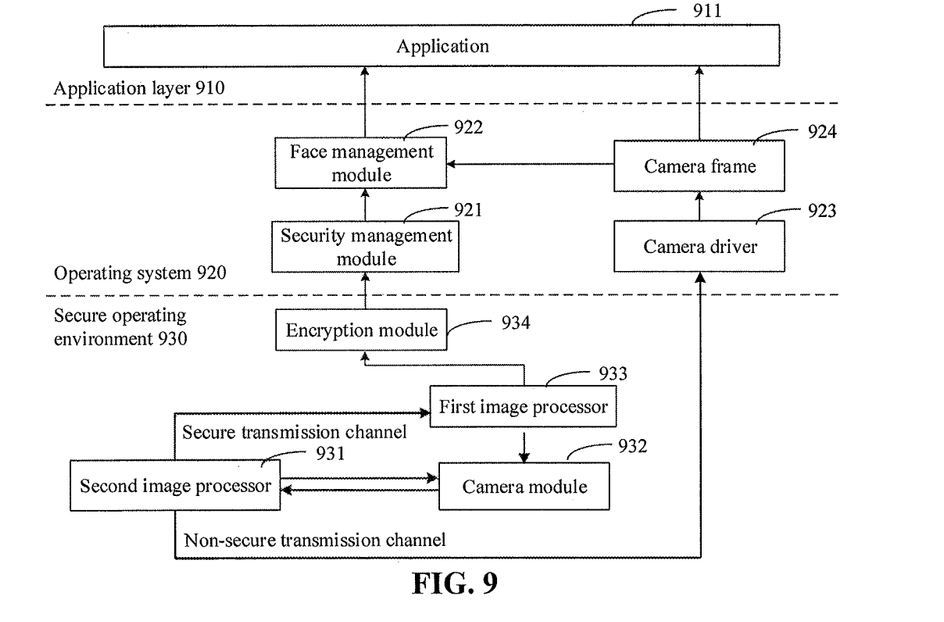
FIG. 9 is a software structure diagram for implementing a method for processing data according to an embodiment of the disclosure.

FIG. 9 is a software structure diagram of implementing an image processing method in an embodiment. As illustrated in FIG. 9, the software structure includes an application layer 910, an operating system 920, and a secure operating environment 930. The modules in the secure operating environment 930 include a second image processor 931, a camera module 932, a first image processor 933, an encryption module 934, and the like. The operating system 930 includes a security management module 921, a face management module 922, a camera driver 923, and a camera frame 924. The application layer 910 includes an application 911. The application 911 may initiate an image acquisition instruction and send the image acquisition instruction to the second image processor 931 for processing. For example, when operations such as paying, unlocking, beauty, and AR are performed by acquiring a face, the application initiates an image acquisition instruction for acquiring a face image. It can be understood that the image acquisition instruction initiated by the application 911 may be first sent to the first image processor 933 and then sent by the first image processor 933 to the second image processor 931.

After the second image processor 931 receives the image acquisition instruction, the second image processor 931 determines that the application operation corresponding to the image acquisition instruction is a security operation (such as payment and unlock operation), and controls the camera module 932 to acquire an infrared image and a speckle image according to the image acquisition instruction. The infrared image and the speckle image acquired by the camera module 932 are transmitted to the second image processor 931. The second image processor 931 calculates a depth image including depth information from the speckle image, calculates a depth parallax image according to the depth image, and calculates an infrared parallax image according to the infrared image. The depth parallax image and the infrared parallax image are sent to the first image processor 933 through a secure transmission channel. The first image processor 933 performs correction according to the infrared parallax image to obtain a corrected infrared image, and performs correction according to the depth parallax image to obtain a corrected depth image. Face authentication is performed according to the corrected infrared image to detect whether there is a face in the corrected infrared image and whether the detected face matches a stored face; if the face authentication succeeds, living body detection is performed according to the corrected infrared image and the corrected depth image to determine whether the face is a living face. The face recognition result obtained by the first image processor 933 may be sent to the encryption module 934, and after being encrypted by the encryption module 934, the encrypted face recognition result is sent to the security management module 921. Generally, each application 911 has a corresponding security management module 921. The security management module 921 decrypts the encrypted face recognition result, and sends the face recognition result obtained after the decryption process to the corresponding face management module 922. The face management module 922 sends the face recognition result to the upper application 911, and the application 911 performs corresponding operations according to the face recognition result.

If the application operation corresponding to the image acquisition instruction received by the second image processor 931 is a non-secure operation (such as beauty and AR operations), the second image processor 931 may control the camera module 932 to acquire a speckle image, calculate a depth image according to the speckle image, and obtain a depth parallax image according to the depth image. The second image processor 931 sends the depth parallax image to the camera driver 923 through a non-secure transmission channel, the camera driver 923 performs correction processing according to the depth parallax image to obtain a corrected depth image, and sends the corrected depth image to the camera frame 924, and then the camera frame 924 sends the corrected depth image to the face management module 922 or the application 911.

FIG. 10 is a structure diagram of a device for processing data in an embodiment. As illustrated in FIG. 10, the device 1000 for processing data includes an activation detection module 1002 and an interface switching module 1004.

The activation detection module 1002 is configured to control, responsive to it is detected that an electronic device activates a front camera, a second processor interface, that connects a first image processor to a rear camera, to disconnect a connection between the first image processor and the rear camera, here, the first image processor is connected to the front camera through a first processor interface.

The interface switching module 1004 is configured to control the first image processor to be connected to a second image processor through the second processor interface, here, the second image processor is connected to the front camera.

According to the device for processing data provided by the above embodiment, the electronic device may control, responsive to it is detected that the front camera is activated, the second processor interface connecting the first image processor to the rear camera to disconnect the connection between the first image processor and the rear camera, and may control the first image processor to be connected to a second image processor through the second processor interface. When the electronic device takes a picture through a camera, generally only one of the front camera and the rear camera is turned on at the same time, so responsive to it is detected that the front camera is activated, the second processor interface for connecting to the rear camera may be used to connect to the second image processor. Thus, the time division multiplexing of the second processor interface by the rear camera and the second image processor can be realized, and resources of the electronic device are saved.

FIG. 11 is a structure diagram of a device for processing data in another embodiment. As illustrated in FIG. 11, the device 1100 for processing data includes an activation detection module 1102, an interface switching module 1104 and an interface reset module 1106.

The activation detection module 1102 is configured to control, responsive to it is detected that an electronic device activates a front camera, a second processor interface, that connects a first image processor to a rear camera, to disconnect a connection between the first image processor and the rear camera, here, the first image processor is connected to the front camera through a first processor interface.

The interface switching module 1104 is configured to control the first image processor to be connected to a second image processor through the second processor interface, here, the second image processor is connected to the front camera.

The interface reset module 1106 is configured to: responsive to it is detected that the front camera is turned off, start timing; responsive to that a timing duration exceeds a duration threshold, control the second processor interface, that connects the first image processor to the second image processor, to disconnect a connection between the first image processor and the second image processor; and control the first image processor to be connected to the rear camera through the second processor interface.

According to the device for processing data provided by the above embodiment, the electronic device may control, responsive to it is detected that a front camera is activated, a second processor interface connecting a first image processor to a rear camera to disconnect a connection between the first image processor and the rear camera, and may control the first image processor to be connected to a second image processor through the second processor interface. When the electronic device takes a picture through a camera, generally only one of the front camera and the rear camera is turned on at the same time, so responsive to it is detected that the front camera is activated, the second processor interface for connecting to the rear camera may be used to connect to the second image processor. Thus, the time division multiplexing of the second processor interface by the rear camera and the second image processor can be realized, and resources of the electronic device are saved.

In an embodiment, the interface switching module 1104 is further configured to: responsive to it is detected that the electronic device activates the front camera, acquire an image acquisition instruction; and responsive to that the acquired image acquisition instruction is a depth image acquisition instruction, control the second processor interface, that connects the first image processor to the rear camera, to disconnect the connection between the first image processor and the rear camera.

In an embodiment, the interface switching module 1104 is further configured to: responsive to that the acquired image acquisition instruction is the depth image acquisition instruction, acquire an application identifier in the depth image acquisition instruction, here, the application identifier is used to indicate an application that issues the depth image acquisition instruction; and responsive to that the application identifier is a preset application identifier, control the second processor interface, that connects the first image processor to the rear camera, to disconnect the connection between the first image processor and the rear camera.

In an embodiment, the interface switching module 1104 is further configured to: acquire an operation identifier in the depth image acquisition instruction, here, the operation identifier is used to indicate an application operation that is to be completed based on a depth image to be acquired; and responsive to that the operation identifier is a preset operation identifier, control the second processor interface, that connects the first image processor to the rear camera, to disconnect the connection between the first image processor and the rear camera.

In an embodiment, the interface reset module 1106 is further configured to: responsive to it is detected that the front camera is turned off, start timing; responsive to that a timing duration exceeds a duration threshold, control the second processor interface, that connects the first image processor to the second image processor, to disconnect the connection between the first image processor and the second image processor; and control the first image processor to be connected to the rear camera through the second processor interface.

In an embodiment, the interface reset module 1106 is further configured to count a frequency at which the front camera is activated, and acquire the corresponding duration threshold according to the frequency.

The division of each module in the above device for processing data is only for illustration, and in other embodiments, the device for processing data may be divided into different modules as needed to complete all or some functions of the above device for processing data.

The embodiment of the disclosure also provides a computer-readable storage medium. One or more non-volatile computer-readable storage medias include a computer-executable instruction that, when executed by one or more processors, causes the one or more processors to perform the method for processing data provided in the above embodiment.

A computer program product is provided. The computer program product includes an instruction that, when executed on a computer, causes the computer to perform the method for processing data described in the above embodiment.

Figure 12:
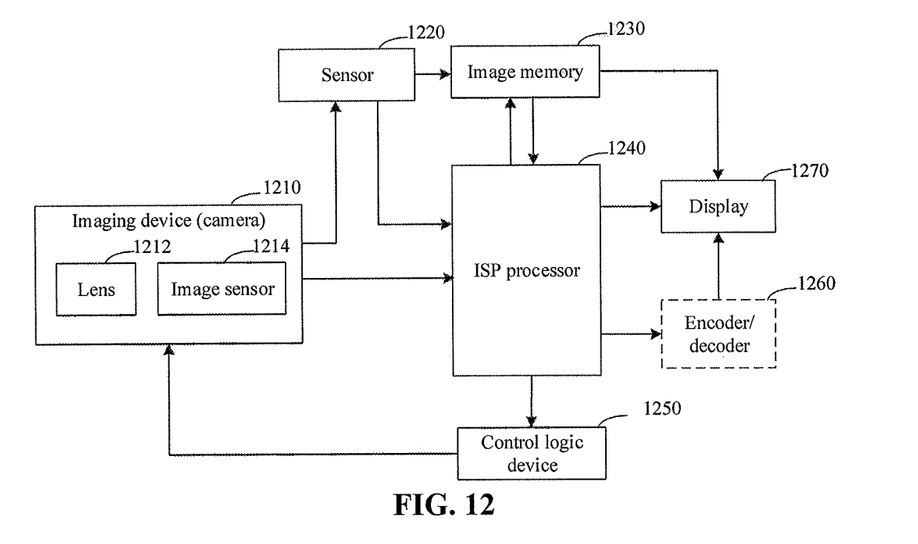
FIG. 12 is a diagram of an image processing circuit according to an embodiment of the disclosure.

The embodiment of the disclosure also provides a mobile terminal. The mobile terminal includes an image processing circuit, and the image processing circuit may be implemented by at least one of hardware components or software components, and may include various processing units defining an Image Signal Processing (ISP) pipeline. FIG. 12 is a diagram of an image processing circuit in an embodiment. As illustrated in FIG. 12, for convenience of explanation, only various aspects of the image processing technology related to the embodiment of the disclosure are illustrated.

As illustrated in FIG. 12, the image processing circuit includes an ISP processor 1240 and a control logic device 1250. Image data captured by an imaging device 1210 is first processed by the ISP processor 1240, and the ISP processor 1240 analyzes the image data to capture image statistics information that can be used to determine one or more control parameters of the imaging device 1210. The imaging device 1210 may include a camera having one or more lenses 1212 and image sensors 1214. An image sensor 1214 may include a color filter array (for example, Bayer filter). The image sensor 1214 may acquire light intensity and wavelength information captured by each of the imaging pixels in the image sensor 1214 and provide a set of original image data that can be processed by the ISP processor 1240. A sensor 1220 (for example, a gyroscope) may provide acquired image processing parameters (for example, anti-shake parameters) to the ISP processor 1240 based on an interface type of a sensor 1220. The sensor 1220 interface may utilize a Standard Mobile Imaging Architecture (SMIA) interface, other serial or parallel camera interfaces, or a combination of the above interfaces.

In addition, the image sensor 1214 may also send original image data to the sensor 1220, the sensor 1220 may provide the original image data to the ISP processor 1240 based on the interface type of the sensor 1220, or the sensor 1220 may store the original image data into an image memory 1230.

The ISP processor 1240 processes the original image data pixel by pixel in a variety of formats. For example, each image pixel may have a bit depth of 8, 10, 12, or 14 bits, and the ISP processor 1240 may perform one or more image processing operations on the original image data, and may collect statistical information about the image data. The image processing operation may be performed according to the same or different bit depths.

The ISP processor 1240 may also receive image data from the image memory 1230. For example, the sensor 1220 interface sends the original image data to the image memory 1230, and the original image data in the image memory 1230 is provided to the ISP processor 1240 for processing. The image memory 1230 may be part of a memory device, a storage device, or a separate dedicated memory within a mobile terminal, and may include Direct Memory Access (DMA) features.

When receiving the original image data from the image sensor 1214 interface or from the sensor 1220 interface or from the image memory 1230, the ISP processor 1240 may perform one or more image processing operations, such as time domain filtering. The processed image data may be sent to the image memory 1230 for additional processing prior to being displayed. The ISP processor 1240 receives processed data from the image memory 1230 and performs image data processing on the processed data in an original domain and in RGB and YCbCr color spaces. The image data processed by the ISP processor 1240 may be outputted to a display 1270, so as to be viewed by a user and/or further processed by a Graphics Processing Unit (GPU). Additionally, the output data of the ISP processor 1240 may also be sent to the image memory 1230, and the display 1270 may read image data from the image memory 1230. In an embodiment, the image memory 1230 may be configured to implement one or more frame buffers. Additionally, the output data of the ISP processor 1240 may be sent to an encoder/decoder 1260 to encode/decode image data. The encoded image data may be saved, and may be decompressed before being displayed on the display 1270 device. The encoder/decoder 1260 may be implemented by a CPU or GPU or coprocessor.

Statistical data determined by the ISP processor 1240 may be sent to a control logic device 1250. For example, the statistical data may include image sensor 1214 statistical information such as auto exposure, auto white balance, auto focus, flicker detection, black level compensation, and lens 1212 shading correction. The control logic device 1250 may include at least one of a processor or a micro controller unit that executes one or more routines (such as firmware), and one or more routines may determine control parameters of the imaging device 1210 and control parameters of the ISP processor 1240 according to the received statistical data. For example, the control parameters of the imaging device 1210 may include sensor 1220 control parameters (such as gain, integration time of exposure control, and anti-shake parameters), camera flash control parameters, lens 1212 control parameters (such as focus or zoom focal length), or a combination of these parameters, etc. The ISP control parameters may include a gain level and color correction matrix for automatic white balance and color adjustment (e.g., during RGB processing), and a lens 1212 shading correction parameter.

In the embodiments of the disclosure, the mobile terminal executes the computer program stored on the memory to implement the operations of the method for processing data in the embodiments of the disclosure.

Any reference used in the disclosure to a memory, storage, a database or other media may include at least one of non-volatile or volatile memories. The appropriate non-volatile memory may include a Read Only Memory (ROM), a Programmable ROM (PROM), an Electrically Programmable ROM (EPROM), an Electrically Erasable Programmable ROM (EEPROM), or a flash memory. The volatile memory may include a RAM, used as an external cache memory. As being illustrative instead of being limitative, the RAM may be obtained in multiple forms such as a Static RAM (SRAM), a Dynamic RAM (DRAM), a Synchronous DRAM (SDRAM), a Dual Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The above embodiment only describes several implementation manners of the disclosure more specifically and in more detail, but cannot be understood as limitation to the patent scope of the disclosure. Those of ordinary skill in the art may also make several variations and improvements without departing from the concept of the disclosure. These variations and improvements fall within the scope of protection of the disclosure. Therefore, the scope of protection of the disclosure should be determined by the appended claims.

The invention claimed is:

1. A method for processing data, performed by an electronic device, the method comprising:
   responsive to it is detected that a front camera is activated, controlling a second processor interface, that connects a first image processor to a rear camera, to disconnect a connection between the first image processor and the rear camera, wherein the first image processor is connected to the front camera through a first processor interface; and
   controlling the first image processor to be connected to a second image processor through the second processor interface, wherein the second image processor is connected to the front camera.

2. The method of claim 1, wherein the front camera comprises a laser camera and a visible light camera.

3. The method of claim 1, wherein the responsive to it is detected that the front camera is activated, controlling the second processor interface that connects the first image processor to the rear camera to disconnect the connection between the first image processor and the rear camera comprises:
   responsive to it is detected that the front camera is activated, acquiring an image acquisition instruction; and
   responsive to that the acquired image acquisition instruction is a depth image acquisition instruction, controlling the second processor interface, that connects the first image processor to the rear camera, to disconnect the connection between the first image processor and the rear camera.

4. The method of claim 3, wherein the responsive to that the acquired image acquisition instruction is the depth image acquisition instruction, controlling the second processor interface that connects the first image processor to the rear camera to disconnect the connection between the first image processor and the rear camera comprises:
   responsive to that the acquired image acquisition instruction is the depth image acquisition instruction, acquiring an application identifier in the depth image acquisition instruction, wherein the application identifier is to indicate an application that issues the depth image acquisition instruction; and
   responsive to that the application identifier is a preset application identifier, controlling the second processor interface, that connects the first image processor to the rear camera, to disconnect the connection between the first image processor and the rear camera.

5. The method of claim 4, wherein the controlling the second processor interface that connects the first image processor to the rear camera to disconnect the connection between the first image processor and the rear camera comprises:
   acquiring an operation identifier in the depth image acquisition instruction, wherein the operation identifier is to indicate an application operation that is to be completed based on a depth image to be acquired; and
   responsive to that the operation identifier is a preset operation identifier, controlling the second processor interface, that connects the first image processor to the rear camera, to disconnect the connection between the first image processor and the rear camera.

6. The method of claim 3, wherein the image acquisition instruction comprises a type identifier, the type identifier is to indicate a type of an image to be acquired that is indicated by the image acquisition instruction.

7. The method of claim 1, further comprising: after the controlling the first image processor to be connected to the second image processor through the second processor interface,
   responsive to it is detected that the front camera is turned off or the rear camera is activated, controlling the second processor interface, that connects the first image processor to the second image processor, to disconnect a connection between the first image processor and the second image processor; and
   controlling the first image processor to be connected to the rear camera through the second processor interface.

8. The method of claim 1, further comprising: after the controlling the first image processor to be connected to the second image processor through the second processor interface,
   responsive to it is detected that the front camera is turned off, starting timing;
   responsive to that a timing duration exceeds a duration threshold, controlling the second processor interface, that connects the first image processor to the second image processor, to disconnect a connection between the first image processor and the second image processor; and
   controlling the first image processor to be connected to the rear camera through the second processor interface.

9. The method of claim 8, further comprising:
counting a frequency at which the front camera is activated, and acquiring the duration threshold according to the frequency.

10. An electronic device comprising:
a first image processor; and
a second image processor;
wherein the first image processor is configured to control, responsive to it is detected that a front camera is activated, a second processor interface, that connects a first image processor to a rear camera, to disconnect a connection between the first image processor and the rear camera, wherein the first image processor is connected to the front camera through a first processor interface; and
the first image processor is further configured to be connected to a second image processor through the second processor interface, wherein the second image processor is connected to the front camera.

11. The electronic device of claim 10, wherein the front camera comprises a laser camera and a visible light camera.

12. The electronic device of claim 10, wherein the first image processor is further configured to:
responsive to it is detected that the front camera is activated, acquire an image acquisition instruction; and
responsive to that the acquired image acquisition instruction is a depth image acquisition instruction, control the second processor interface, that connects the first image processor to the rear camera, to disconnect the connection between the first image processor and the rear camera.

13. The device of claim 12, wherein the first image processor is further configured to acquire, responsive to that the acquired image acquisition instruction is the depth image acquisition instruction, an application identifier in the depth image acquisition instruction, wherein the application identifier is to indicate an application that issues the depth image acquisition instruction; and
control, responsive to that the application identifier is a preset application identifier, the second processor interface, that connects the first image processor to the rear camera, to disconnect the connection between the first image processor and the rear camera.

14. The electronic device of claim 13, wherein the first image processor is further configured to acquire an operation identifier in the depth image acquisition instruction, wherein the operation identifier is to indicate an application operation that is to be completed based on a depth image to be acquired; and
control, responsive to that the operation identifier is a preset operation identifier, the second processor interface, that connects the first image processor to the rear camera, to disconnect the connection between the first image processor and the rear camera.

15. The electronic device of claim 12, wherein the image acquisition instruction comprises a type identifier, wherein the type identifier is to indicate a type of an image to be acquired that is indicated by the image acquisition instruction.

16. The electronic device of claim 10, wherein the first image processor is further configured to:
responsive to it is detected that the front camera is turned off or the rear camera is activated, control the second processor interface, that connects the first image processor to the second image processor, to disconnect a connection between the first image processor and the second image processor; and
control the first image processor to be connected to the rear camera through the second processor interface.

17. The electronic device of claim 10, wherein the first image processor is further configured to:
responsive to it is detected that the front camera is turned off, start timing;
responsive to that a timing duration exceeds a duration threshold, control the second processor interface, that connects the first image processor to the second image processor, to disconnect a connection between the first image processor and the second image processor; and
control the first image processor to be connected to the rear camera through the second processor interface.

18. The electronic device of claim 17, wherein the first image processor is further configured to count a frequency at which the front camera is activated, and acquiring the duration threshold according to the frequency.

19. The electronic device of claim 18, wherein the first image processor is further configured to: establish correspondences between respective frequencies at which the front camera is activated in different periods of time and duration thresholds.

20. The electronic device of claim 19, wherein the first image processor is further configured to acquire the duration threshold corresponding to the frequency according to the frequency and the correspondences.

* * * * *